United States Patent [19]

Lewis

[11] Patent Number: 4,657,100
[45] Date of Patent: Apr. 14, 1987

[54] PORTABLE GOLF CART

[76] Inventor: Andrew R. Lewis, 9166 E. 4th St., Tulsa, Okla. 74112

[21] Appl. No.: 806,036

[22] Filed: Dec. 6, 1985

Related U.S. Application Data

[63] Continuation-in-part of Ser. No. 661,076, Oct. 15, 1984, abandoned.

[51] Int. Cl.⁴ .............................................. B62B 1/04
[52] U.S. Cl. ..................... 180/19.1; 280/38; 280/646; 280/655; 280/472; 280/DIG. 5; 180/68.5; 188/82.77; 224/274
[58] Field of Search .............. 280/641, 645, 646, 655, 280/62, 47.2, 87.04 R, DIG. 5, DIG. 6, 38; 188/82.4, 82.77, 82.3; 180/68.5, 19.1; 224/241, 274, 282

[56] References Cited

U.S. PATENT DOCUMENTS

| | | | |
|---|---|---|---|
| 864,334 | 8/1907 | Pilz | 280/11.21 |
| 2,687,895 | 8/1954 | Rutledge | 280/DIG. 6 |
| 3,167,146 | 1/1965 | Rudolph | 180/19.1 |
| 3,232,367 | 2/1966 | York | 180/19.1 |
| 3,561,555 | 2/1971 | Carmichael | 180/19.2 |
| 3,734,439 | 5/1973 | Wintz | 224/274 |
| 3,815,699 | 6/1974 | Ganskopp et al. | 180/11 |
| 3,820,617 | 6/1974 | Groff | 180/19.1 |
| 3,867,993 | 2/1975 | Lizuka | 180/19.1 |
| 3,893,532 | 7/1975 | Perlowin | 180/19.1 |
| 3,907,056 | 9/1975 | Thomas, III | 180/19 R |
| 3,948,332 | 4/1976 | Tyner | 180/19.1 |
| 3,952,821 | 4/1976 | Craven | 180/19.1 |
| 4,252,870 | 2/1981 | Nemeth | 180/68.5 |
| 4,550,930 | 11/1985 | Proffit | 224/274 |

Primary Examiner—David M. Mitchell
Assistant Examiner—Richard M. Camby
Attorney, Agent, or Firm—Head, Johnson & Stevenson

[57] ABSTRACT

This invention concerns a portable golf cart. It includes two wheels which support an axle upon which is mounted a main horizontal frame. An elongated bag support frame for holding the golf clubs is connected to the frame by a pivot connection so that the bag support frame can rotate from one position where it is essentially perpendicular to the horizontal frame to a second position where it is in alignment with such horizontal frame. The bag support frame can be locked in either position. The bag support frame itself is made of at least two sections that are pivoted with respect to each other so that they can be in an extended position or one section can be folded over the other so as to form a compact golf cart when the bag support frame is in its folded position and is rotated into alignment with the axle.

8 Claims, 8 Drawing Figures

PORTABLE GOLF CART

CROSS-REFERENCE TO RELATED APPLICATION

This is a continuation-in-part of co-pending application Ser. No. 661,076 filed Oct. 15, 1984, abandoned Dec. 6, 1985, entitled "PORTABLE GOLF CART", Andrew R. Lewis, Inventor.

STATEMENT OF THE DISCLOSURE

A preliminary patentability search reveals the following U.S. Pat. Nos.: 3,167,146; 3,232,367; 3,561,555; 3,820,617; 3,867,993; 3,893,532; 3,948,332; and 3,952,821.

These patents show various type golf carts which may be collapsed or taken apart to become portable. The closest patent appears to be U.S. Pat. No. 3,815,699, however, in that patent handle 16 does not pivot or fold over such as that described in the attached application. Further, bracket 26 is provided to removably connect together the control frame and the drive frame.

Copies of these patents are enclosed for the Examiner's convenience.

BACKGROUND OF THE INVENTION

1. Field of the Invention

The present invention relates generally to a golf cart and more particularly to a golf cart which is collapsable into a compact cart without disassembly for transportation from one location to another. The golf cart can be propelled by a motor or it can be pushed manually.

2. General Background

There have been many different types of self-propelled or manually pushed golf carts proposed and built. However, most of these prior type golf carts are not easily transported from one location to another. In an effort to make the carts more portable, it has been suggested for example as taught in U.S. Pat. No. 3,815,699, that they be manufactured such that they are easily disassembled for transportation from one location to another and then reassembled for use.

It is an object of the present invention to provide a portable golf cart which can be easily collapsed for transportation and then when transported, extended to its non-collapsed position for ready use without disassembling or assembling.

SUMMARY OF THE INVENTION

In the preferred embodiment, this invention concerns a portable golf cart which comprises an axle supported by wheels at either end. A main frame is supported by the axle and is aligned therewith. An elongated bag support frame is supported from the main frame and is perpendicular to the longitudinal axis therof when in its operating position. The bag support frame is connected by pivot connection to the main frame and can be rotated from a first position where the bag support frame is perpendicular to the longitudinal axis to the main frame to a second position where it is aligned therewith. Means are provided to lock the bag support frame in either of the selected positions.

The bag support frame has an upper support frame section and a lower support frame section which are pivotally attached to each other so that the upper section can be folded down over the lower section. A wheel is provided at the lower end of the bag support frame and a handle at the upper end and golf bag retaining means are mounted on the bag support frame.

There is also provided a ratchet clutch assembly for one or both of the main drive wheels.

There is also provided a spillproof battery holder which is supported by pivot means attached to the main horizontal frame.

Various other objects and a better understanding of the invention can be had from the following description taken in conjunction with the drawings.

DETAILED DESCRIPTION OF THE PREFERRED EMBODIMENT

Figure 1:
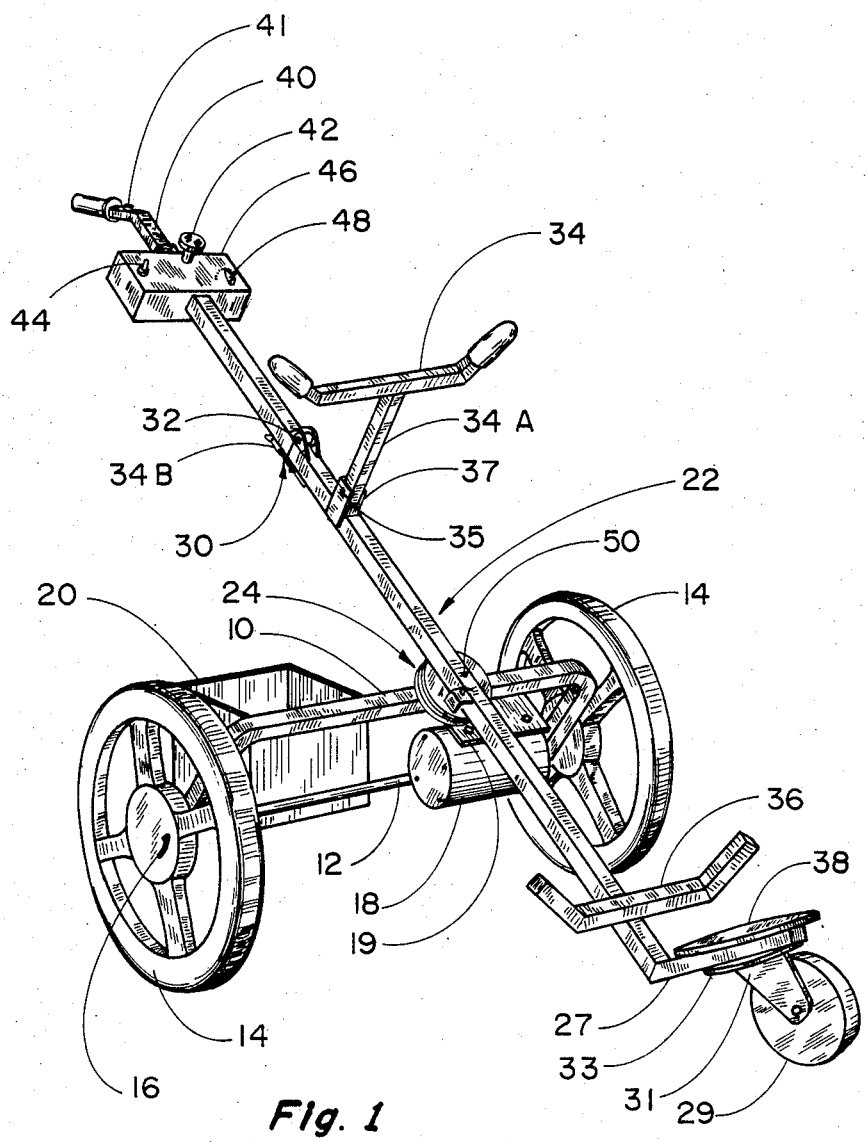
FIG. 1 illustrates the portable golf cart in its expanded or usable position.
Figure 5:
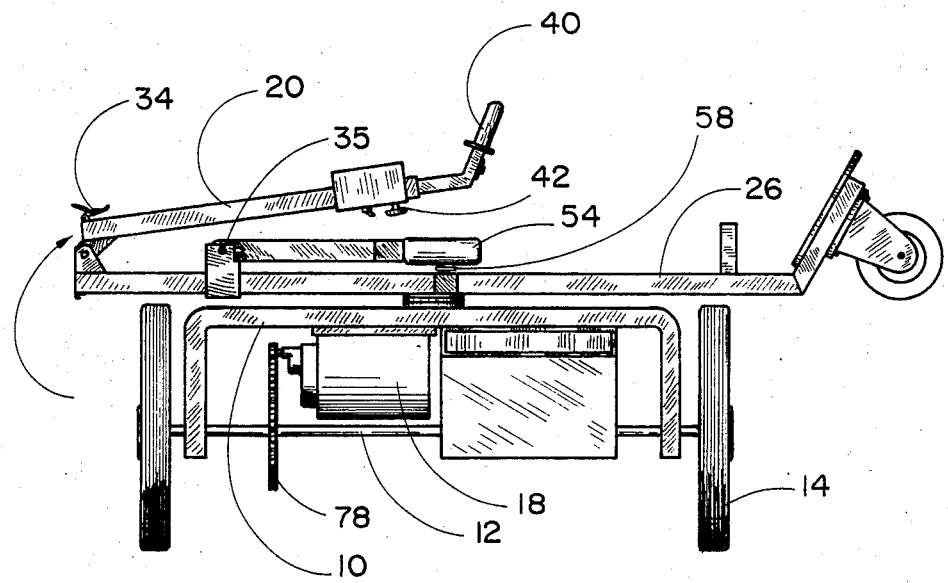
FIG. 5 illustrates the golf cart in a collapsed position.
Figure 6:
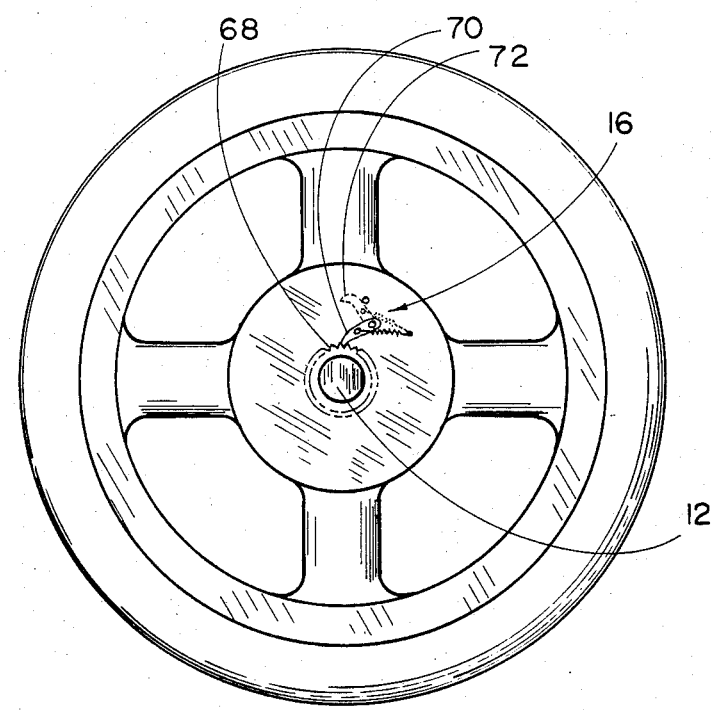
FIG. 6 illustrates the ratchet drive means of the wheels.

Attention is first directed to FIG. 1 which shows the portable self-propelled golf cart in its expanded position ready for operation. Shown thereon is a main horizontal frame 10 supported from the axle 12 which supports wheels 14. A ratchet means 16 is provided and will be described more fully in regard to FIG. 6. A motor 18, which may be an electric motor driven by a battery supplied in carrier box 20, can be connected by gears 78 as shown in FIG. 5 to drive axle 12. Of course, various means of using an electric motor or gasoline motor or other type motors to drive an axle such as 12 are well known.

A golf bag support frame 22 is connected by pivot connection means 24 to the frame 10. The golf bag support frame 22 includes a lower support frame section 26 and an upper support frame section 28 Such upper section and lower section are connected by a pivot means 30 which includes a pivot pin 32 and a latch 34B.

Figure 4:
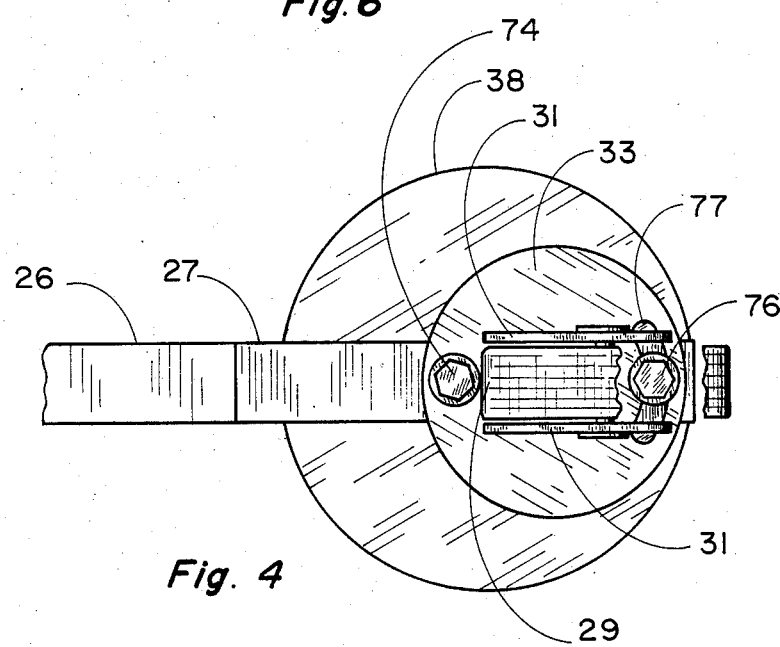
FIG. 4 is a bottom view of the front wheel of the cart shown in FIG. 1.

Mounted on lower support frame section 26 is an upper craddle 34 having an upright member 34A which is connected by pivots 35 thereto. Upright member 34A of the upper craddle 34 may be tightly fitted into upright member frame 37 so that the upper craddle 34 will stay either in the upright position as shown in FIG. 1 or in a collapsed position down against the lower support frame section 26. A lower craddle 36 is provided at the lower end of the lower support frame 26 and at the extreme lower end of such frame 26, there is an angle member 27 supporting wheel 29. A bag support plate 38 is supported from angle member 27 for receiving the lower end of a golf bag. FIG. 4 is a lower view of the wheel 27 and bag support plate 38 and clearly shows wheel support arms 31 supported from plate 33 which is connected by bolts 74 and 76 to angle member 27. Arcuate slot 77 is provided in plate 33 so that the direction of the wheel can be properly aligned. By loosening bolts 74 and 76, plate 33 can be rotated about bolt 74 until wheel 29 is properly aligned. The bolts are then tightened.

Figure 2:
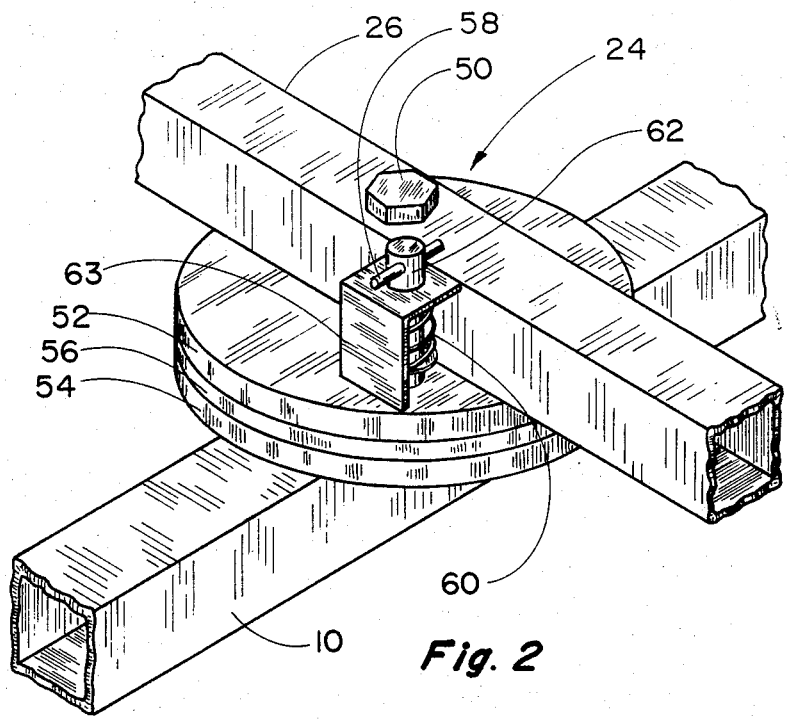
FIG. 2 illustrates the pivoting connection between the bag support frame and the main horizontal frame.
Figure 3:
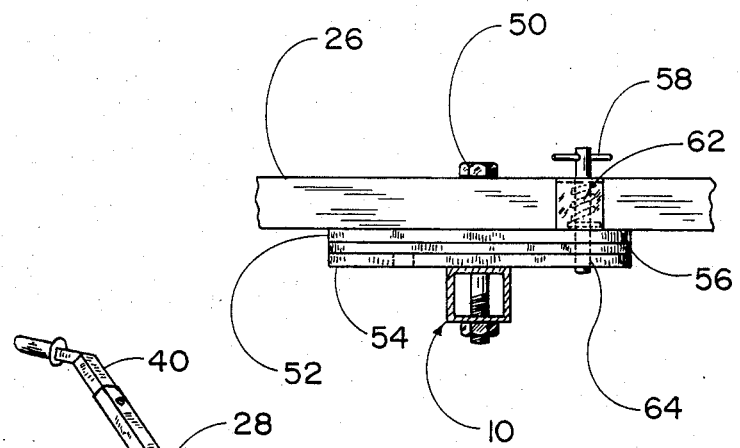
FIG. 3 illustrates the means for locking the pivot hole connection of FIG. 2 in selected positions.

Attention is next directed to FIG. 2, which shows in more detail, the pivotal connection 24 of FIG. 1 which connects the golf bag support frame 22 to a main frame 10. Shown thereon is an upper plate 52 which is attached to lower support frame section 26 such as by welding as indicated in FIG. 3. A lower plate 54 is attached to frame 10. A positioning maintaining rod 62 is supported from frame 63 which is attached to plate 52. A spring 60 urges rod 62 in a downward direction toward plate 54. A bearing plate 56 is maintained between plate 52 and plate 54 and it may be a plastic or nylon plate. It is preferably secured to upper plate 52. A bolt 50 extends through lower support frame section 26, plates 52 and 54, bearing 56 and main frame 10 as shown in FIG. 3.

Lower support frame 26 can be rotated about bolt 50 to one of two selected positions. As shown therein, there is a pair of holes 64 and 62 extending through the bottom plate 54. When in one position, the bolt 62 extends through hole 64 of plate 54 as indicated in FIG. 3. When in this position, the lower support frame section 26 is perpendicular to the main frame 10 and the device is in the position shown in FIG. 1. When it is desired to collapse the golf cart, the bolt 62 is pulled upwardly by pulling on handle 58 to compress spring 60 and rod 62 then clears plate 54 and the lower support frame section 26 and plates 52 and 56 are rotated until bolt 62 is aligned with hole 66 at which time the handle 58 is released and the spring 60 causes the rod to go into hole 66. There is it in the position where lower support frame section 26 is aligned in the same direction with frame 50.

Attention is next directed to FIG. 5 which shows the portable golf cart in its collapsed position. As can be seen therein, upper craddle 54 has been collapsed onto lower support frame section 26 and latch 34B has been released and upper support frame section 28 has pivoted about pivot means 30 to where upper support frame section 28 is folded down essentially on lower support frame section 26. Golf bag support frame 42 has been pivoted about pivotal connection 24 so that rod 62 is now in hole 66 so that the lower support frame section 26 is aligned with the main frame 10. It is quite apparent from FIG. 5, the golf cart is in a collapsed position where it can be easily picked up and placed in the trunk of an automobile and it consumes much less overall space than when in the expanded position shown in FIG. 1. No disassembly is required.

Various types of controls can be applied to the motor 18. Some of these are indicated in FIG. 1. An on-off switch is provided on handle 40. A control panel 46 is provided adjacent handle 40. Shown thereon is a speed control button 44, and a timer 48 to preset the amount of time which the motor will run. For example, one can start the golf cart down a golf rail and may wish it to run for one minute inthe directed direction and then stop. This can be accomplished with timer 48 using well known timing facilities. Handle 40 can telescope into upper support frame section 28 and can be set in an adjusted position by adjusting knob 42 for adjusting the handle 40. This permits the handle to be adjusted in accordance with the individual preference. This also permits the handle to be turned either to the left or right.

When the motor 18 is driving the golf cart, sometimes it is desired to change the direction of the golf cart. To aid this and not to have to have a differential gear in axle 12, I provide a ratchet clutch or means 16. This is indicated more clearly in FIG. 6 which shows ratchet gear 68 and pawl 70. Ratchet gears 68 are supported by the axle 12 and pawls 70 are supported from the wheels 14. When turning the cart, the ratchet means in the pivoting wheel merely slips. If it is desired to disengage the ratchet pawls, it can be done by simply moving its arm to the position down by dotted line 72 and then pinned in position in a known manner. The ratchet clut provides duel wheel drive or single wheel drive on either left or right with just a flip of the ratchet arm. This also provides free wheeling for pushing or pulling the cart. This ratchet clutch may be mounted either on the outside of the wheel or the inside.

FIG. 5 shows the portable golf cart in a collapsed position. It is apparent that it would be quite easy to unfold the cart from the position shown above in FIG. 5 to its operating position as shown in FIG. 1. I lift the cart out of the trunk of the car or off the truck as the case may be, set it on the ground and unfold the upper support frame section 28 about pivot 30 and lock it in position by latch 34B. Then, upper craddle 34 is pulled about pivot 35 to its bag holding position. The rod or bolt 62 is pulled up by handle 58 and frame 26 is pivoted about bolt 50 to its position shown in FIG. 1. Handle 58 is released and bolt 62 enters hole 66 of lower plate 54 locking the pivot in the second position. We then have the cart in its operating position. A portable golf cart very similar to that shown in FIG. 1 has been built and it takes less than 30 seconds to fold it from the position in FIG. 1 to that in FIG. 5 and likewise takes less than 30 seconds to unfold it from the position of FIG. 5 into that of FIG. 1.

Figure 8:
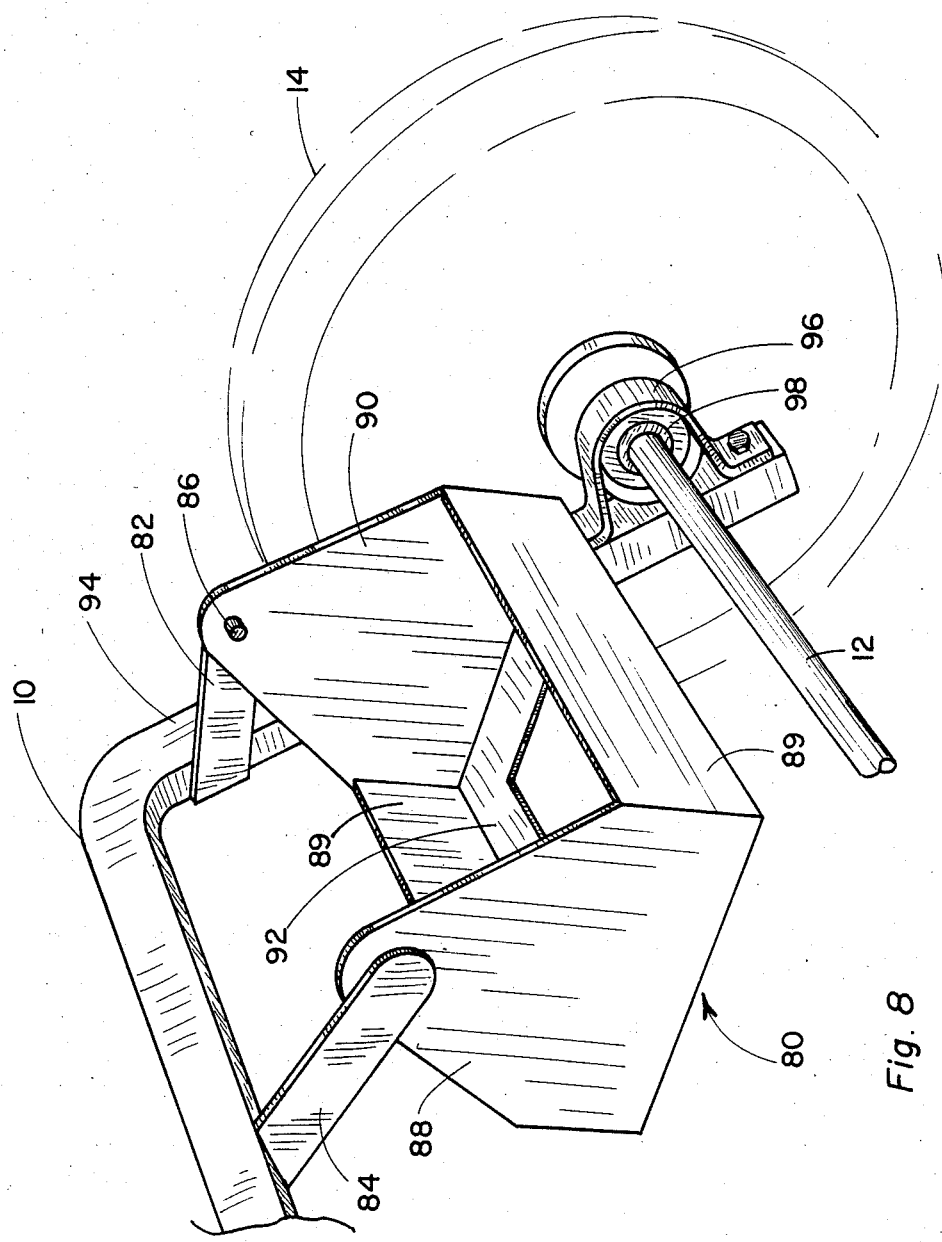
FIG. 8 illustrates an embodiment featuring a spillproof battery holder.

Golf bag support frame 22 is connected by pivot connection means 24 to the fame 10. In using golf bag carrier, the golf bag holder 22 and the handle will be rotated to various positions so that the battery holder 20 shown in FIG. 1 will no always be in the same positon but will rotate to various positions. Without my invention as shown in FIG. 8, the battery holder may not always keep the battery at an upright position and if the battery gets tilted too much to one side, there is the likelihood that it may lose some of it fluid. If this in the trunk of a car, it could cause serious damage to the car. With my device in FIG. 8, I prevent this mishap. I have developed and especially spillproof battery holder which is shown in FIG. 8. The battery holder 80 includes end members 88 and 90 with a bottom 92 and side members 89. Shown therein, is the battery holder 80 which is supported from arms 82 and 84 which extend outwardly from main horizontal frame 10. The arm 82 is supported from the vertical portion 94 of the main horizontal frame 10. Pivot pin 86 is secured to arm 82 and extends through a hole in end member 90 of the battery holder 80. A similar pivot pin is provided with arm 84 and likewise extends through a hole in end member 88. Vertical portion 94 of the main frame 10 is supported from axle 12 by bracket 12 which holds bushing 98.

In operation, a battery is placed in battery holder 80 to supply the power for driving the golf cart. As frame 10 rotates about axle into various positions, the battery holder 10 rotates about pivot pins 86 so that the battery holder is always such that the battery in the holder will always be in a vertical position. This is especially important when the cart is to be put into the trunk of an automobile. There the device will be lifted by frame 10, for example, and the frame may be moved from one position to another to accommodate the shape of the trunk.

In doing this, the arms 82 and 84 will move but the battery holder 80 will pivot about pivot pins 86 and the weight of the battery in the holder 80 will cause the holder to rotate so that the battery is always in an upright position.

Figure 7:
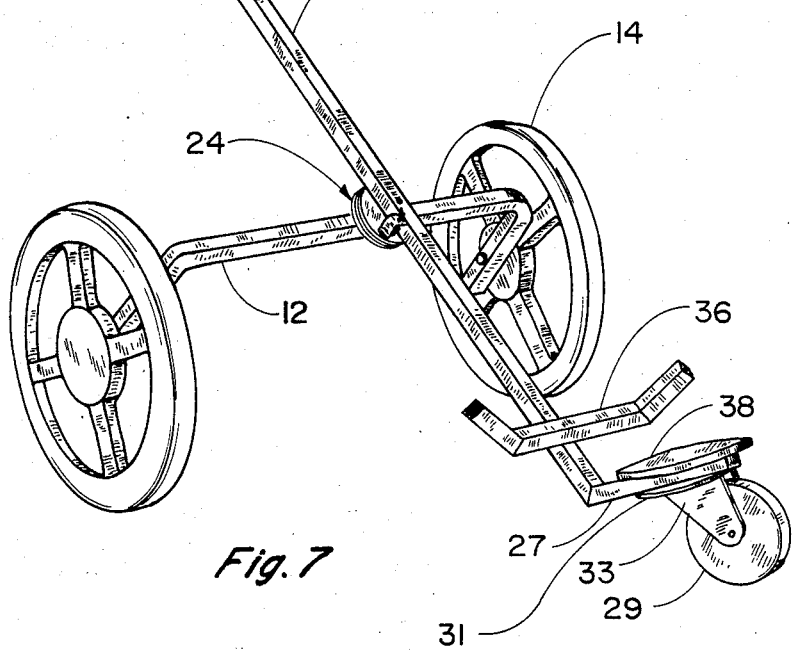
FIG. 7 illustrates the portable golf cart of FIG. 1 without the motor drive means.

Although it is preferred to propel the golf cart by a motor, the collapsable principal applies to manually pulled golf carts. This is illustrated in FIG. 7 in which the motor 12 and its accessories including the control panel 46 have been removed. Also, it is no longer necessary to have the ratchet and pawl assembly 16. Also, if desired, cradle 34 does not have to have support arm 34A nor pivot 35.

While this invention has been described with a certain degree of particularity, it is manifest than many changes may be made in the details of construction in the arrangement of components without departing from the spirit and scope of the disclosure. It is understood that the invention is not limited to the embodiment set forth herein for purposes of exemplification, but is limited only by the scope of the attached claim or claims, including the full range of equivalency to which each element thereof is entitled.

What is claimed is:

1. A portable golf cart comprising:
an axle;
wheels supported by said axle;
a main frame supported by said axle;
a bag support frame having an upper support frame section and a lower support frame section pivotally attached to each other such that the upper bag support frame section can be folded over the lower support frame section;
a pivot connector attaching said bag support framed to said main frame so that said bag support frame can be rotated into substantial alignment with said axle, said connector including a lower plate attached to said main frame, an upper plate attached to said lower bag support frame, a bearing plate positioned between said lower plate and said upper plate, said lower plate having first and second spaced apart locking holes extending at least partially therethrough, said upper plate and said bearing plate having a rod hole extending therethrough, a rod extendable through said rod hole and biased toward said lower plate, a handle for pulling said rod upwardly out of said first locking hole of said lower plate so that said upper plate and said bearing plate may be rotated with respect to said lower plate until said rod is aligned with the said second locking hole in said lower plate, and a bolt extending through said rod hole and into a selected one of said locking holes.

2. A portable golf cart comprising:
an axle;
wheels supported by said axle;
a main frame supported by said axle;
a bag support frame having an upper support frame having an upper support frame section and a lower support frame section pivotally attached to each other such that the upper bag support fame section can be folded over the lower support frame section;
a bag support plate located at and supported by the lower end of said lower support frame section and a lower plate section mounted beneath said bag support plate, said lower plate having an arcuate slot therein, a pair of arms extending downwardly from said lower plate section, a wheel supported by said arm;
a first bolt extending through said arcuate section to said upper plate and a second bolt extending through said lower plate exterior arcuate section and to said bag support plate;
a pivot connector attaching said bag support frame to said main frame so that said bag support frame can be rotated to substantial alignment with said axle.

3. A portable golf cart comprising:
an axle;
a first wheel and a second wheel supported by said axle;
a main frame supported by said axle, said axle rotatable with respect to said main frame;
a bag support frame having an upper support frame section and a lower support frame section pivotally attached to each other such that the upper bag support frame section can be folded over the lower support frame section;
a pivot connection attaching said bag support frame to said main frame so that said bag support frame can be rotated into substantial alignment with said axle;
a ratchet gear connected to at least one end of said axle and a pawl connected to at least one of said wheel so as to form a ratchet gear and pawl assembly at least one end of said axle;
a first arm and a second arm rigidly attached to and supported from said main frame in planes substantially parallel to each other;
a pivot pin at the outer end of each said support arm;
a battery holder having a first end member with a first hole therein and a second end member with a second hole therein, said first hole for receiving said first pivot pin and said second hole for receiving said second pivot pin;
said battery holder having a bottom.

4. A cart as defined in claim 3 including a support wheel at the lower end of said lower support frame section.

5. A cart as defined in claim 1 including a motor supported by said frame for driving said wheels.

6. A cart as defined in claim 5 in which said motor is an electrical motor and includes a control panel mounted on the upper end of said upper support frame section and having speed control and a timer mounted thereon.

7. A cart as defined in claim 1 including two spaced apart arms supported by said main frame, a pivot on each such arm, a battery holder having a first and a second end member, each such end member having a hole therein through which one of said pivot pins is inserted.

8. A cart as defined in claim 2 including two spaced apart arms supported by said main frame, a pivot on each such arm, a battery holder having a first and a second end member, each such end member having a hole therein through which one of said pivot pins is inserted.

* * * * *